United States Patent [19]

O'Flarity

[11] Patent Number: 5,436,826

[45] Date of Patent: Jul. 25, 1995

[54] DUAL CONTROL WITH DUAL SENSOR AVERAGING AND SUBSTITUTION

[75] Inventor: Linda O'Flarity, Palm Beach Gardens, Fla.

[73] Assignee: United Technologies Corporation, Hartford, Conn.

[21] Appl. No.: 139,485

[22] Filed: Oct. 20, 1993

[51] Int. Cl.6 .............................................. G06F 15/46
[52] U.S. Cl. .................................... 364/184; 364/187; 371/9.1
[58] Field of Search ............................ 364/184–187; 371/8.1, 8.2, 9.1, 14, 24

[56] References Cited

U.S. PATENT DOCUMENTS

| | | | |
|---|---|---|---|
| 3,881,670 | 5/1975 | Doniger | 371/14 |
| 4,412,280 | 10/1983 | Murphy et al. | 371/24 |
| 4,644,538 | 2/1987 | Cooper et al. | 371/9.1 |
| 5,170,343 | 12/1992 | Matsuda | 364/184 |
| 5,206,810 | 4/1993 | Bools et al. | 364/184 |

Primary Examiner—Roy N. Envall, Jr.
Assistant Examiner—Thomas E. Brown
Attorney, Agent, or Firm—Robert E. Greenstien

[57] ABSTRACT

A gas turbine engine with dual fuel controls is disclosed. The controls have individual sensors that monitor N2. Each control uses the average value of N2 from both sensors for providing fuel to the engine and performing other operations. The fuel controls contain signal processors capable of determining if their respective sensors are operating out of range, in which case the fuel control uses the value of N2 from sensor associated with the other fuel control. If both sensors are out of range, the signal processors use a stored value for N2 or a value synthesized from another engine parameter. The signal processors are also capable of retesting the sensor over successive cycles to see if the sensor has corrected and is within a tighter range. If the difference between sensor values exceeds a range, the sensor with the best value for N2 is used.

10 Claims, 2 Drawing Sheets

DUAL CONTROL WITH DUAL SENSOR AVERAGING AND SUBSTITUTION

TECHNICAL FIELD

This invention relates to dual controls, such as dual fuel controls used with gas turbine engines, and, in particular, to the use of dual or redundant sensors to control a common operation, for instance fuel flow.

BACKGROUND OF THE INVENTION

Some gas turbine engines are controlled by two fuel control systems, each responding to one or more sensors that provide signals indicating engine operating conditions, such as high rotor speed N2. Each control is sometimes called a "channel". Each control has a sensor to sense the engine operating condition. Ideally, the sensors are closely matched in their respective output signal levels. While the outputs do not have to be exactly the same, if one sensor is "out of the range", the other controller will try to compensate. Internal, diagnostic routines may cause the first channel to shutdown. This takes place more often when the internal filters in each controller-used to smooth response to transients-are proportional-integral because the difference between the sensor outputs increases with time, producing errors so great that the two channels would diverge, one being full on the other full off.

DISCLOSURE OF THE INVENTION

Among the objects of the present invention is to provide an improved dual channel control particularly suited for use with gas turbine engines.

According to one aspect of the invention, the average of the sensor values is used as long as the sensor outputs are within a certain range of each other and neither sensor has been found to be outside its acceptable range.

According to one aspect of the invention, when a sensor is found to be outside its acceptable range, the other sensor is used until the first sensor (local sensor) is found to be acceptable under a more stringent test for a set number of test cycles. For instance, if N2 for a sensor is more than 50 rpm out of range, the output must be with 25 rpm of the range for N tests before the sensor will be used by the local channel.

According to one aspect of the invention, if both sensors fail, a stored value for the sensor values is used.

According to the invention, if the sensor outputs disagree beyond a certain amount, the one with the most conservative value for the parameter that is senses is used.

According to the invention, if the sensors have not been found to have failed, the average of the two sensors is used by each channel.

A feature of the invention is that sensor averaging avoids unnecessary channel fights in a dual active control system by ensuring that both channels run from the same operating point at all times, reducing (eliminating) dependency on trim balances for anything but control loop compensation. Another feature is that by comparing sensors fault isolation is improved. Faults are isolated to a particular sensor, avoiding the possibility of loops using different sensor data. Sensor substitution improves fault accommodation by allowing all control loops to remain dual active for a single sensor failure and any combination dissimilar sensor; in other words, at no time does one channel shut-down.

Other objects, benefits and features of the invention will be apparent to one skilled in the art from the following discussion and drawings.

BEST MODE FOR CARRYING OUT THE INVENTION

Figure 1:
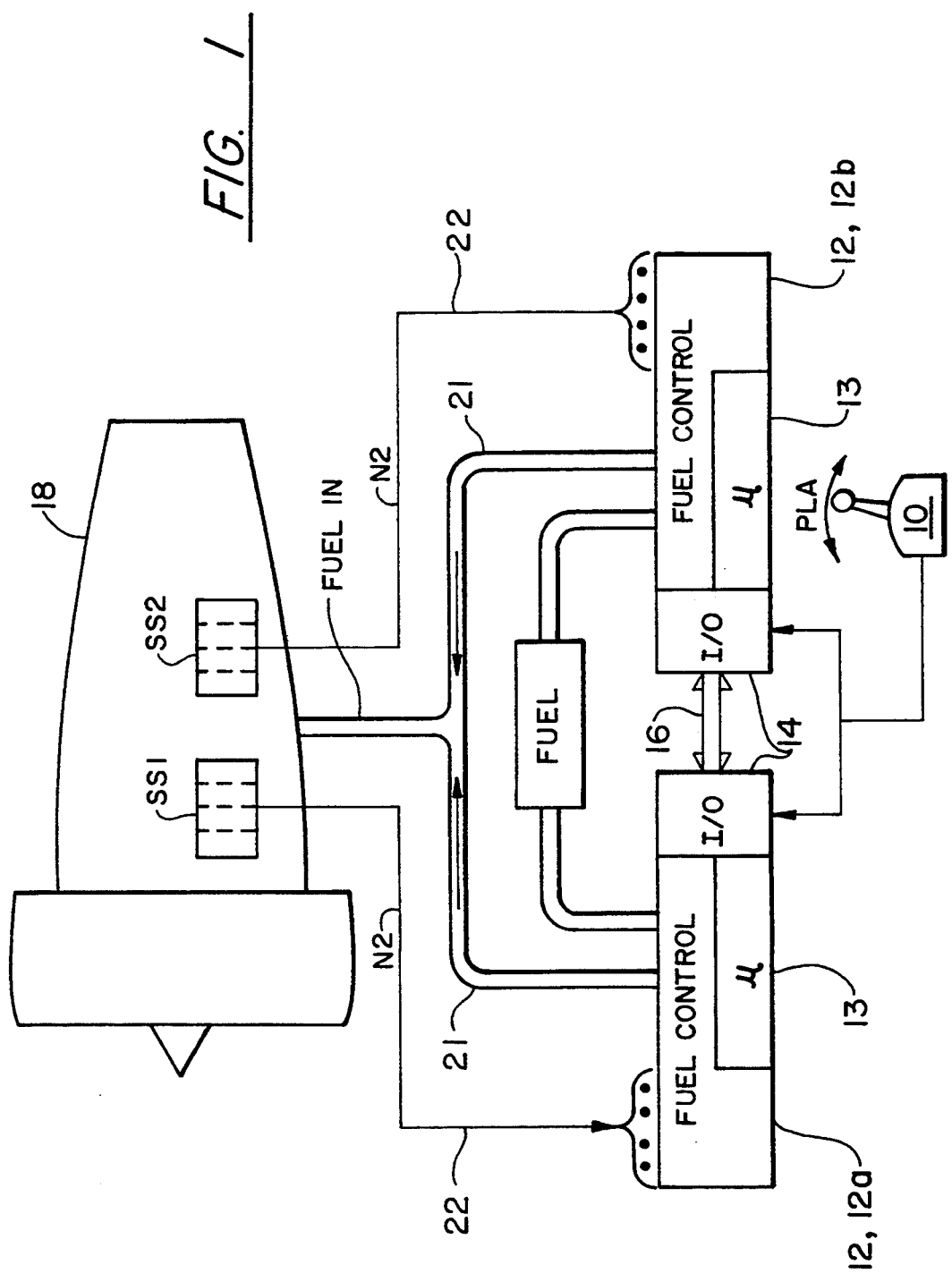
FIG. 1 is simplified functional block diagram of a dual channel gas turbine control system.

In FIG. 1, a single throttle control 10 is connected to two fuel controls 12. Each contains a signal processor or computer 13 with an input/output (I/O) section 14. The controls 12 are connected by communication bus 16, each control 12 receiving a plurality of signals from one of two sensors SS1 and SS2 associated with a gas turbine engine 18. The sensors SS1 and SS2 provide redundant signals with signal levels or values manifesting engine operating conditions, such as temperature, pressure, fan speeds, fuel flow, just to mention a few of the many engine operating conditions that a fuel control may use to regulate engine speed. The fuel controls receive fuel from a fuel source (FUEL) and supplies fuel individually over fuel lines 21 to the engine burner (not shown). The invention centers on the exchange of information between the two fuel controls 12 in response to engine operating conditions sensed by the sensors SS1 and SS2 and differences that may arise between those sensors regarding the value of the their respective output signals for a parameter. For simplicity, high speed fan speed N2 has been shown as being indicated on a signal line 22 that extends from sensor to the fuel control 12. Sensor SS1 provides a value for N2 simultaneously with sensor SS2, which provides its value for N2 to the other fuel control 12. In a manner explained below with the aid of the flow chart that forms FIG. 2, the two fuel controls 12 communicate to determine what value to use for N2 in scheduling fuel supply to the engine to achieve a particular value for N2 for a particular power lever setting or PLA (power lever advance).

Figure 2:
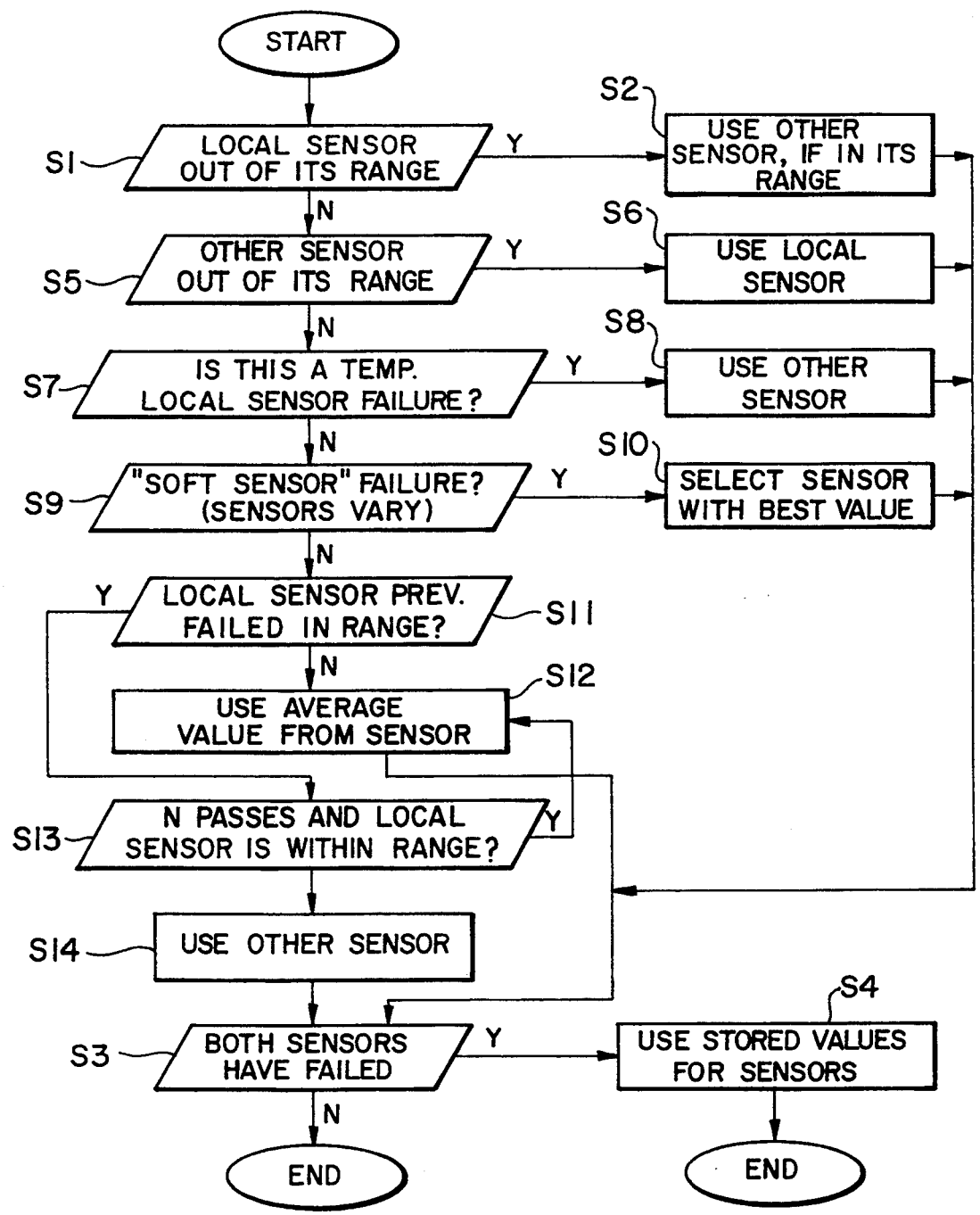
FIG. 2 is a flow chart of signal processing steps used by a signal processor in each channel in accordance with the present invention.

Each fuel control is programmed to implement the sequences shown in FIG. 2 and also communicate over the bus 16 the results so that one of the sensors is used by both controls to schedule fuel flow or so that the average of the sensor values (e.g. N2) is used by both fuel controls, as a result of which neither fuel control will ever shut down because its sensor (the "local sensor") is outside its a range. When a sensor is outside its range, the output exceeds an acceptable level. For instance, N2 may read as high as 20,000 rpm normally, but a reading of 25,000 would be impossible-only if the sensor producing the reading is faulty. The sequences in FIG. 2 determine this and then impose a higher standard on the faulty sensor before it is removed from a fault status, which, according to the invention, causes the fuel controls 12 to use the "other sensor". The sequence can be used, of course, for each of plurality of sensors, and in that regard, it should be recalled that numerals SS1 and SS2 identify a plurality of sensors (the dotted lines).

At step S1 in FIG. 2, a test is made to determine if the local sensor is out of range. For instance, the signal processor 13 in fuel control 12a would perform this test on one of the sensors SS1 and the signal processor in fuel control 12b would perform it on the counterpart one of the sensors SS2 that measures the same parameter as the tested one of sensors SS1. An affirmative answer moves the sequence to the command at step S2, where the other sensor, e.g. SS2 is used, assuming that it too has passed the test at step S1 (performed by the fuel control 12b). If both have failed the test, step S3 yields an affirmative answer, causing the action of step S4, where a default (stored) value for the sensor output (e.g. stored or save value for N2) is used. Returning attention to step S1, a negative answer there moves the sequence to step, where it is determined in the other sensor is out of range. For instance, the sensor SS2 may be out of range, as determined by fuel control 12b at step S1 and in step S2, fuel control 12a obtains that status over the bus 16. This causes the fuel control 12a to use its sensor and fuel control 12b to also use sensor SS1 for the value of the measured parameter, e.g. N2. This action is taken at step S6, which also leads to step S3, which this time produces a negative answer. Assume that step S5 produces a negative answer, step S7 determines if the out of range condition at the local sensor, e.g. sensor SS1 for fuel control 12a and SS2 for fuel control 12b, is from noise or is real. If it is real, even if temporary, the other sensor is used, which may create a conflict of sorts if both fuel controls determine that their local sensors are faulty (each pointing to the other for a valid sensor). But step S3 resolves the conflict by using a default value. A negative answer at step S7 moves the sequence to step S9, which tests to see if there is a variance, beyond an acceptable level, between the outputs from the two sensors SS1 and SS1 under test. An affirmative answer moves the sequence to step S10, where the sensor with the best value is used. Since there is not a conflict, step S3 produces an negative answer, the sensor selected in step S10 being used by both fuel controls to control fuel flow. Steps S12-13 are best considered this way: When a local sensor, sensor SS1 for example, is found to be out of range, a fault flag is set telling the fuel controls to use the other sensor, e.g. sensor SS2 over sensor SS1. Sensor SS1, found faulty, may be used again-the flag removed - - - if it can pass a more stringent test called for convenience here "in range". By this it is meant, for example, that if N2 is out of range because it is 10% to high, it will only be found valid (the fault flag for it removed) if it is less than 5% high on successive tests. Step S11 determines if a previously faulty sensor failed an "in range" test. If the answer is negative, step S12 causes the fuel controls to use the average value of the of the outputs from the sensors under test. On the other hand, if the test at step S11 is affirmative, the faulty sensor can only be considered a valid source of parameter data if it makes N passes through step S11, for that yields an affirmative answer, causing the average value for the sensors to be used at step S12. If the test at step S13 is failed, the sensor has failed to meet the more stringent test and the other sensor continues to be used, a command function shown at step S14. From step S14, the signal processing sequence moves to previously described step S3, where the other sensor is used unless it is determined that both sensors are faulty, in which case a stored value (assumed or synthesized from other parameters of sensors) for the faulty sensor values is used at step S4.

As noted, testing the local sensor is made by its directly connected fuel control, and the status of the sensor is communicated to the other fuel control of the bus, the two fuel controls (their signal processors) exchanging information derived by running the same test sequences (shown in FIG. 2) and using the same protocols. The end result is that the best sensor is used if the sensor outputs vary less than the out of range value but beyond some set level of variation; the average value is used if the sensors are good; or if both are bad a stored value (or a value synthesized from another parameter) is used. At no time is either control without valid sensor data, meaning it can operate. The practical effect of this is that each fuel control will handle half the fuel flow at all times.

Modifications, variations, and alterations to this embodiment of the invention may have been discussed, and with the benefit of that an the explanation of the invention, one skilled in the art may be able to make yet other modifications in whole or in part without departing from its true scope and spirit of the invention.

I claim:

1. A control system comprising first and second controllers, a sensor connected to the first controller, a sensor connected to the second controller, and the sensors each producing a signal representing the magnitude of a common parameter used by each of the controllers to produce an output, the output from each controller being summed to provide a control signal, characterized by:

each controller comprising a signal processor, and a communication bus between each controller, each signal processor comprising means for producing a controller output signal based on the average value of the signals produced by the sensors, for producing a fault signal indicating that a sensor connected to the controller produces a signal outside of an acceptable range, for removing the fault signal if a sensor that causes the fault single produces a signal with a value not greater than an acceptable value, less than the maximum value for said acceptable range, during a plurality of successive tests of the sensor by the signal processor and for using a signal produced by a sensor connected to the other controller in response to said fault signal; and means for providing data communication between signal processors in each controller.

2. The control system described in claim 1, further characterized in that the fault signal is produced when the local sensor signal exceeds a maximum value by a first percentage and the signal processor comprise means for removing the fault signal if a sensor produces a signal that does not exceed a said maximum value by a second percentage less than the first percentage over a plurality of successive sample of the sensor signal.

3. The control system described in claim 2, further characterized in that each signal processor comprises means for selecting a sensor connected to the other controller when a difference between the values for both sensors exceeds a stored level.

4. The control system described in claim 3, further characterized in that each signal processor comprises means for using a stored value in place of the local sensor signal when both signal processors produce a fault signal.

5. A gas turbine control system comprising two fuel controls each connected to an associated engine sensor providing a signal with a value indicating the magnitude of the same engine operating parameter, characterized in that:

each fuel control contains a signal processor and signals processors are in communication with each other;

each signal processor comprises means for providing a fault signal indicating that a local sensor in communication with the signal processor is providing a single value at an out of range value exceeding an acceptable value, for removing the fault signal if the value for the local sensor signal is within an acceptable range for a plurality of successive samples, the range being less than a range defined by the difference between the acceptable value and the out of range value for using the local sensor in communication with the other signal processor in response to the fault signal and for using the average value from both sensors in the absence of the fault signal.

6. The gas turbine engine described in claim 5, further characterized in that each signal processor comprises means for selecting the local sensor with a signal value closest to a preset value for other engine operating conditions when the difference between the signal values between the local sensors exceeds a stored level.

7. The gas turbine engine described in claim 6, further characterized in that the signal processors comprise means for using a stored value for the value of the parameter when both signal processors produce the fault signal for the respective local sensor.

8. A method for using two controls, each producing a component in a summed output to provide system control based on the output of two sensors that provide signals representing the magnitude of a common parameter, each sensor supplying the output to one of the two controls, characterized by the steps of:

each control providing a fault signal if the sensor connected to it is providing a signal exceeding an acceptable level and removing the fault signal after successive tests of the sensor producing the fault signal, if each test demonstrating that the output from the sensor meets a more stringent signal level test that the level that caused the production of the fault signal;

communicating the fault signal to the other control to cause the other control to provide, to the control producing the fault signal, the signal value for the sensor connected to said other control which uses said signal value to produce an output; and in the absence of the fault signal, each control using the average of the sensor outputs to produce an output.

9. The method described in claim 8, further characterized by the step of using default value for the sensor outputs is used in both controls produce a fault signal.

10. The method described in claim 8, further characterized by the step of comparing the levels of the outputs from the sensors and using the output form the sensor with a value closest to a stored level, if the outputs differ by more than a certain amount.

* * * * *